United States Patent
Kane et al.

(10) Patent No.: US 8,405,250 B2
(45) Date of Patent: Mar. 26, 2013

(54) ELECTRONIC DEVICE CONTROL SYSTEM AND METHOD

(75) Inventors: Ajit Kane, Erie, PA (US); Emil N. Nikolov, Erie, PA (US); Jeffrey Zimmerman, Lawrence Park, PA (US); Paul Bachmaier, Lawrence Park, PA (US); Patrick Walsh, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 12/572,950

(22) Filed: Oct. 2, 2009

(65) Prior Publication Data

US 2011/0080041 A1    Apr. 7, 2011

(51) Int. Cl.
*H02J 1/00* (2006.01)
*H02J 3/00* (2006.01)

(52) U.S. Cl. ......................................................... 307/82

(58) Field of Classification Search .................. 307/82, 307/9.1; 361/71, 131
See application file for complete search history.

(56) References Cited

U.S. PATENT DOCUMENTS

| | | | |
|---|---|---|---|
| 2002/0048181 A1* | 4/2002 | Kobayashi et al. | 363/71 |
| 2002/0074969 A1 | 6/2002 | Edelson | |
| 2009/0067203 A1 | 3/2009 | Chakrabarti et al. | |
| 2010/0290261 A1* | 11/2010 | Sullivan | 363/131 |

FOREIGN PATENT DOCUMENTS

| | | |
|---|---|---|
| EP | 1811641 A1 | 7/2007 |
| EP | 2017952 A1 | 1/2009 |
| JP | 62268396 A | 11/1987 |
| JP | 7135782 A | 5/1995 |

OTHER PUBLICATIONS

The PCT International Search Report and Written Opinion issued in connection with corresponding International Application No. PCT/US2010/051084 on Mar. 24, 2011.

* cited by examiner

*Primary Examiner* — Carlos Amaya
(74) *Attorney, Agent, or Firm* — GE Global Patent Operation; John A. Kramer

(57) ABSTRACT

There is provided a system and method for controlling an electronic device. An exemplary method comprises employing a look-up table to derive waveform value data for a multi-phase reference waveform. The exemplary method also comprises employing the look-up table to derive waveform value data corresponding to harmonic data for the multi-phase reference waveform. Harmonic data is injected into the multi-phase reference waveform to produce a harmonic reference waveform. The exemplary method additionally comprises generating a plurality of control signals from the harmonic reference waveform.

16 Claims, 22 Drawing Sheets

200

304

304

600

800

308

308

308

310

310

1300

| Signal Name | Size (bits) | Enumeration/Values | Scaling | Type | Min/Max | Register Address |
|---|---|---|---|---|---|---|
| Carrier Count | 16 | The Max Count Value for the Triangular Wave | None | Unsigned Int | 0-65535 | 24003108 |
| Modulator Count | 16 | The Count Difference Between Sine Wave Samples | None | Unsigned Int | 0-65535 | 24003104 |
| Moulation Index | 16 | Modulation Index of the Reference Sine Wave | 4096 | Unsigned Int | 0-8 | 2400310c |
| Min on/off Time | 16 | | 1 = 15.625 nS | | | 24003184 |
| Dead Time | 16 | | 1 = 15.625 nS | | | 24003188 |
| Third Harmonic Modulation Index | 16 | Modulation Index of the Third Harmonic | 4096 | Unsigned Int | 0-1 | 24003110 |
| Inverter Flags | 16 | Contains the Flags for Enable/Disable, Modes Etc | None | Unsigned Int | NA | 24003100 |

| | Bit | Function |
|---|---|---|
| | 0 | Global Enable/Disable for the Inverter. 0 - Enable, 1 - Disable |
| | 1 | Third Harmonic Enable. 0 - Disable, 1 - Enable |
| | 2 | PWM Mode Bit. 0 - Asynchronous PWM, 1 - Synchronous PWM |
| | 3 | Square Wave Mode. 0 - PWM Mode, 1 - Square Wave Mode |
| Inverter Flags | 4 | AUP Output Enable 1 Enable |
| | 5 | BUP Output Enable 1 Enable |
| | 6 | CUP Output Enable 1 Enable |
| | 7 | ADN Output Enable 1 Enable |
| | 8 | BDN Output Enable 1 Enable |
| | 9 | CDN Output Enable 1 Enable |
| | 10 | |
| | 11 | |
| | 12 | |
| | 13 | |
| | 14 | |
| | 15 | Data Valid. 0 - Invalid/Old Data, 1 - Valid/New Data |

ELECTRONIC DEVICE CONTROL SYSTEM AND METHOD

BACKGROUND

Exemplary embodiments of the present invention relate generally to a system and method for controlling inverters, such as insulated gate bipolar transistor (IGBT) inverters. Moreover, such exemplary embodiments may relate to firing inverters in a system of a diesel-electric locomotive.

Traction vehicles such as, for example, locomotives, employ electric traction motors for driving wheels of the vehicles. In some of these vehicles, the motors are alternating current (AC) motors whose speed and power are controlled by varying the frequency and the voltage of AC electric power supplied to the motors. Commonly, the electric power is supplied at some point in the vehicle system as DC power and is thereafter converted to AC power of controlled frequency and voltage amplitude. The electric power may be derived from an on-board alternator driven by an internal combustion engine or may be obtained from a wayside power source such as a third rail or overhead catenary.

Inefficiency in the process of controlling the inverters that produce AC power can adversely affect the efficiency of the entire locomotive. In general, there is a need for a more efficient system and method for controlling the firing of inverters in power systems.

SUMMARY

Briefly, in accordance with an exemplary embodiment of the present invention, there is provided a method for controlling an electronic device. An exemplary method comprises employing a look-up table to derive waveform value data for a multi-phase reference waveform. The exemplary method also comprises employing the look-up table to derive waveform value data corresponding to harmonic data for the multi-phase reference waveform. Harmonic data is injected into the multi-phase reference waveform to produce a harmonic reference waveform. The exemplary method additionally comprises generating a plurality of control signals from the harmonic reference waveform.

Another exemplary embodiment of the present invention relates to an inverter control system. The inverter control system comprises a storage medium that stores a look-up table containing waveform value data. The inverter control system also comprises a control circuit that is adapted to create a multi-phase reference waveform and harmonic data based on the waveform value data, to create a harmonic reference waveform based on the multi-phase reference waveform and the harmonic data, and to generate a plurality of control signals from the harmonic reference waveform.

Yet another exemplary embodiment of the present invention relates to a power system for a vehicle. The exemplary power system comprises a plurality of inverters and a plurality of electronic devices that are powered by the inverters. The power system also comprises a storage medium that stores a look-up table containing waveform value data. The power system additionally comprises a control circuit that is adapted to create a multi-phase reference waveform and harmonic data based on the waveform value data, to create a harmonic reference waveform based on the multi-phase reference waveform and the harmonic data, to generate a plurality of control signals from the harmonic reference waveform, and to drive the plurality of inverters with the plurality of control signals.

DRAWINGS

These and other features, aspects, and advantages of the present invention will become better understood when the following detailed description is read with reference to the accompanying drawings in which like characters represent like parts throughout the drawings, wherein.

Figure 3A:
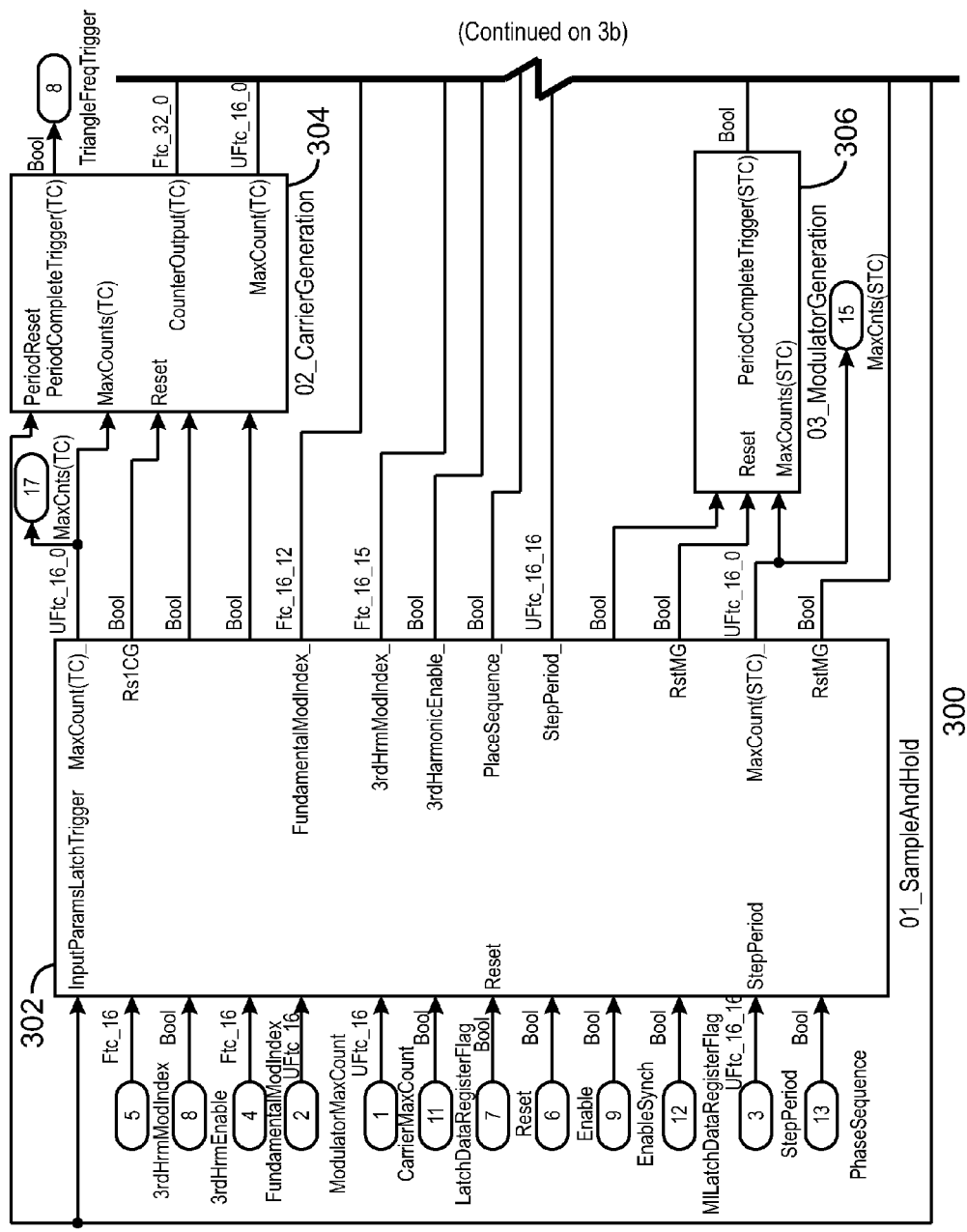
Figure 3B:
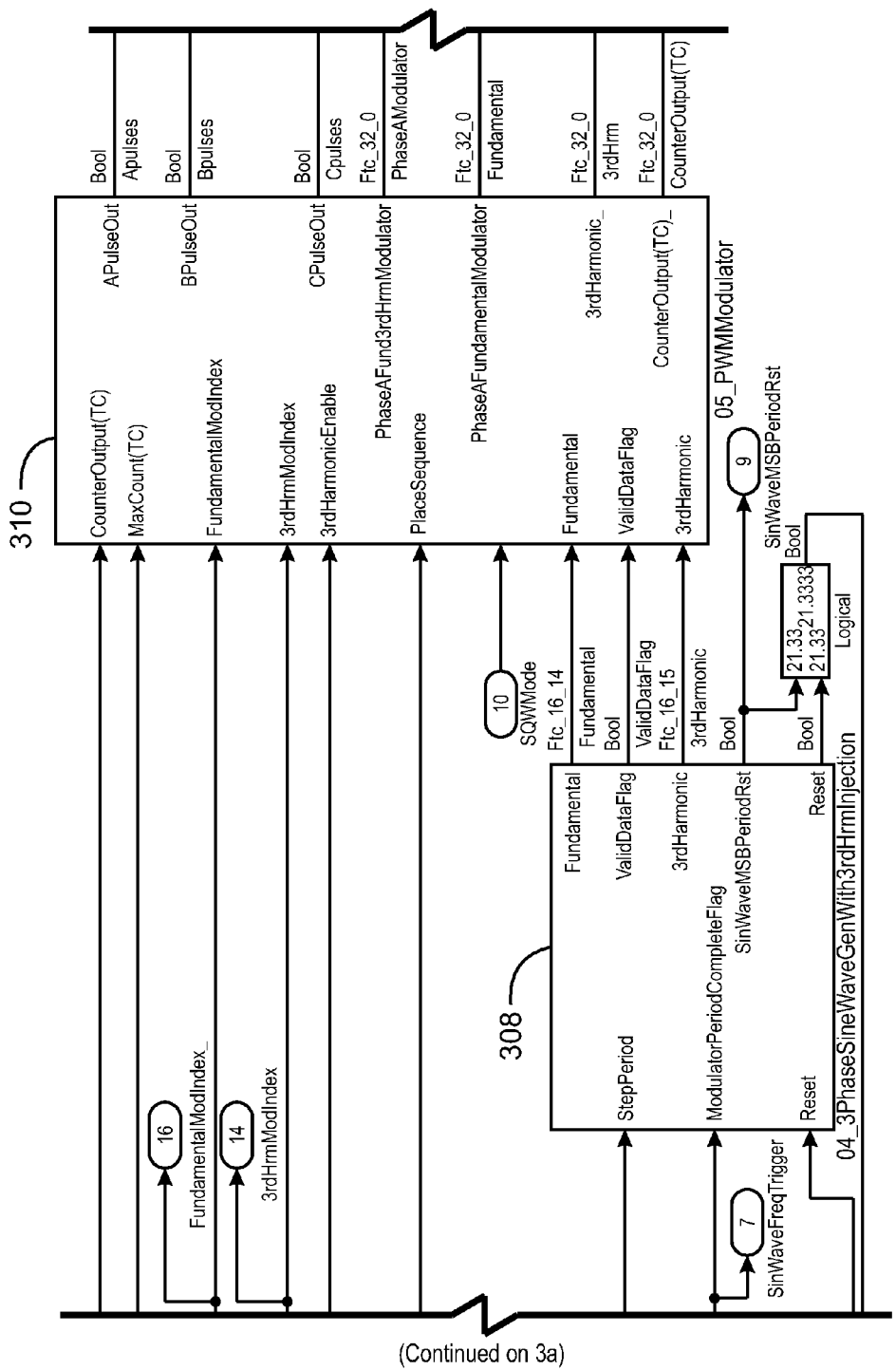
Figure 3C:
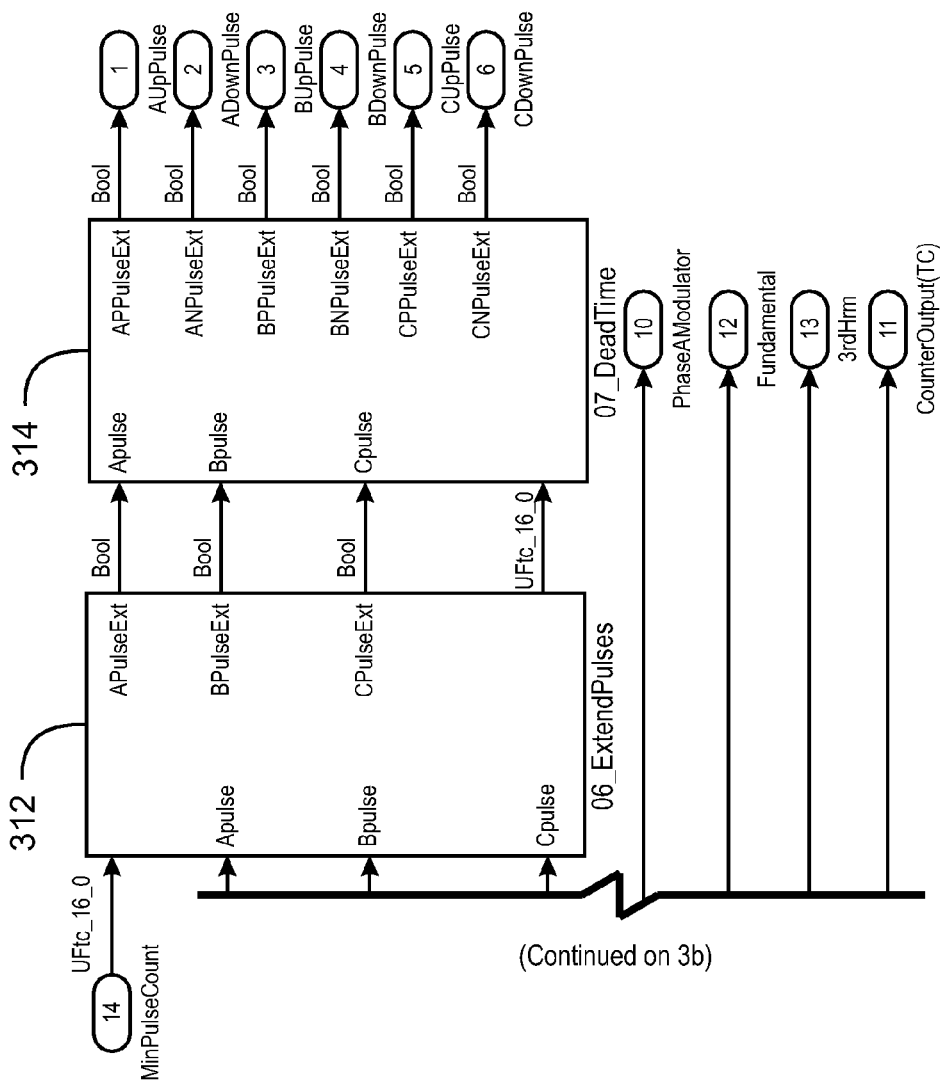
Figure 4:
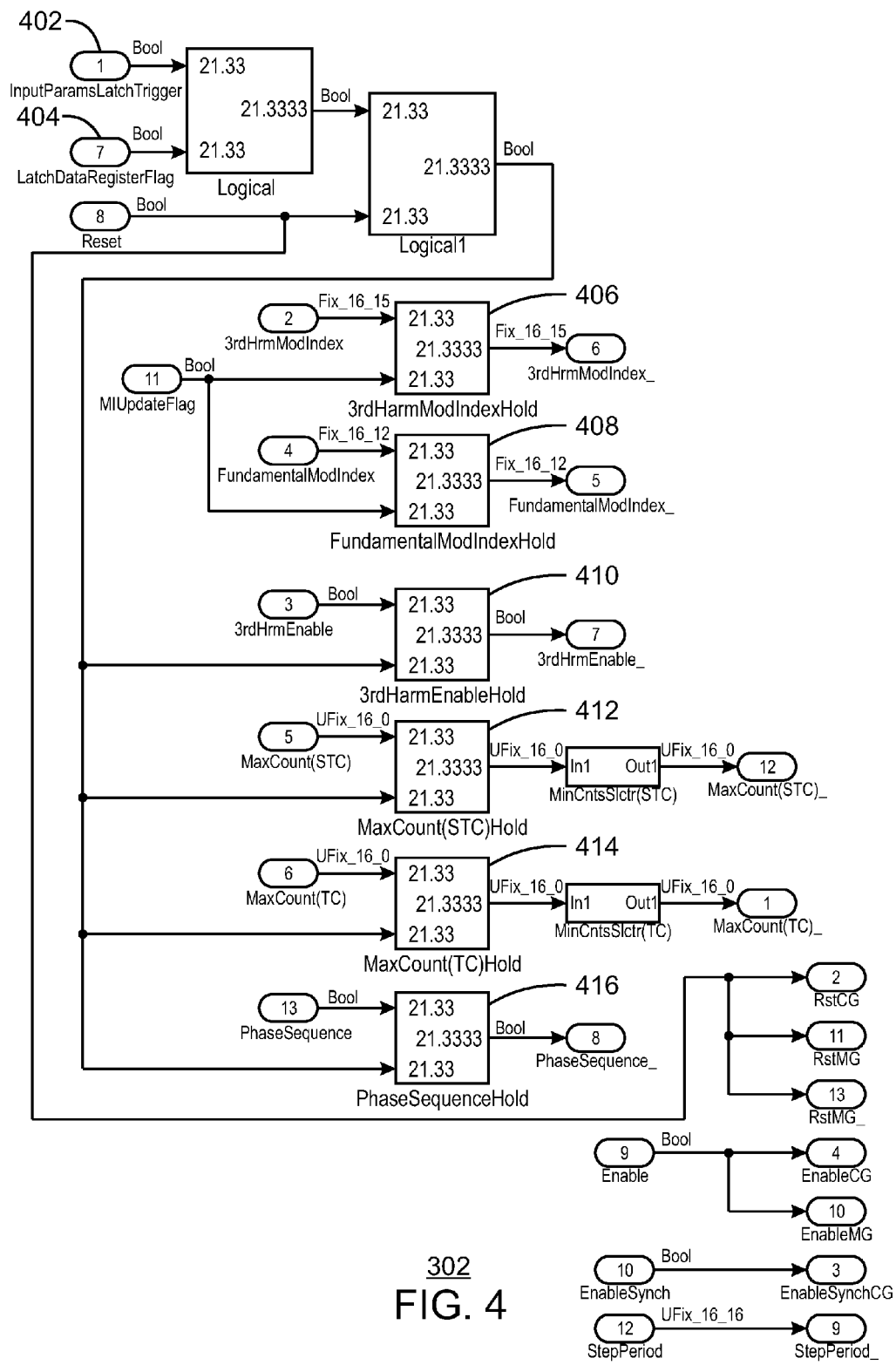
Figure 5A:
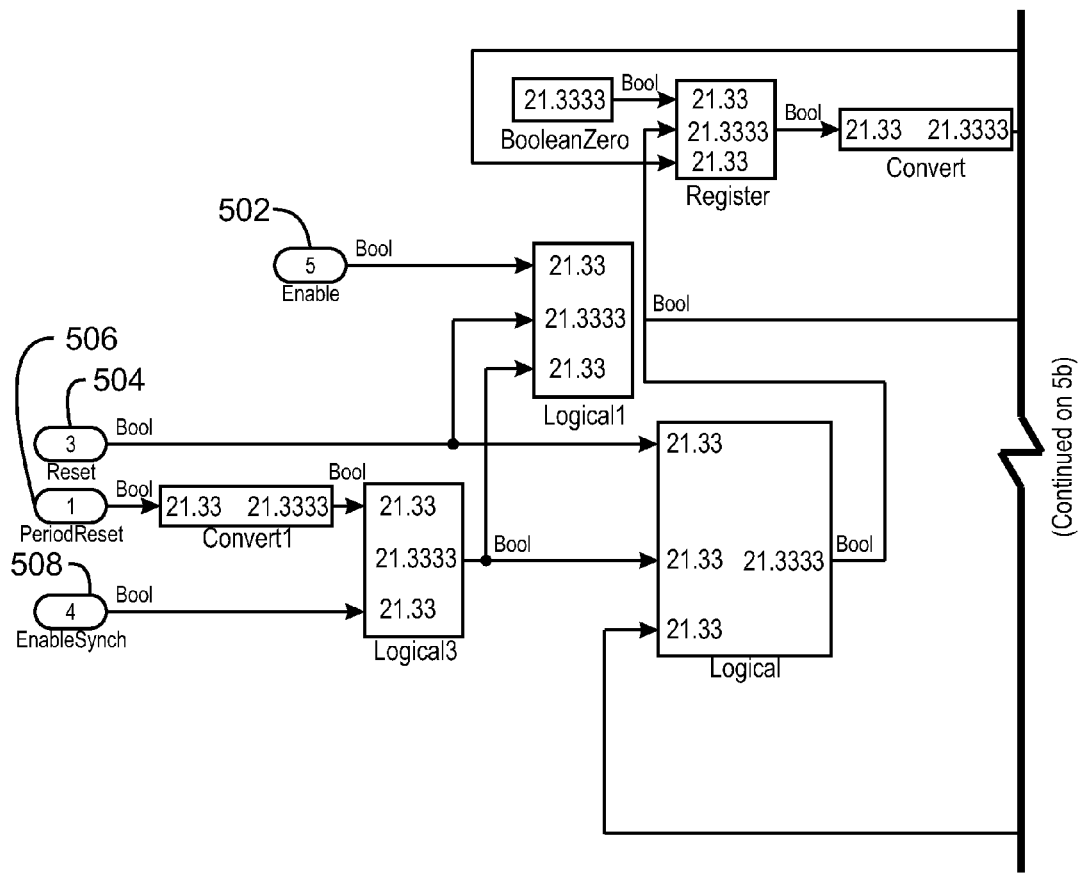
Figure 5B:
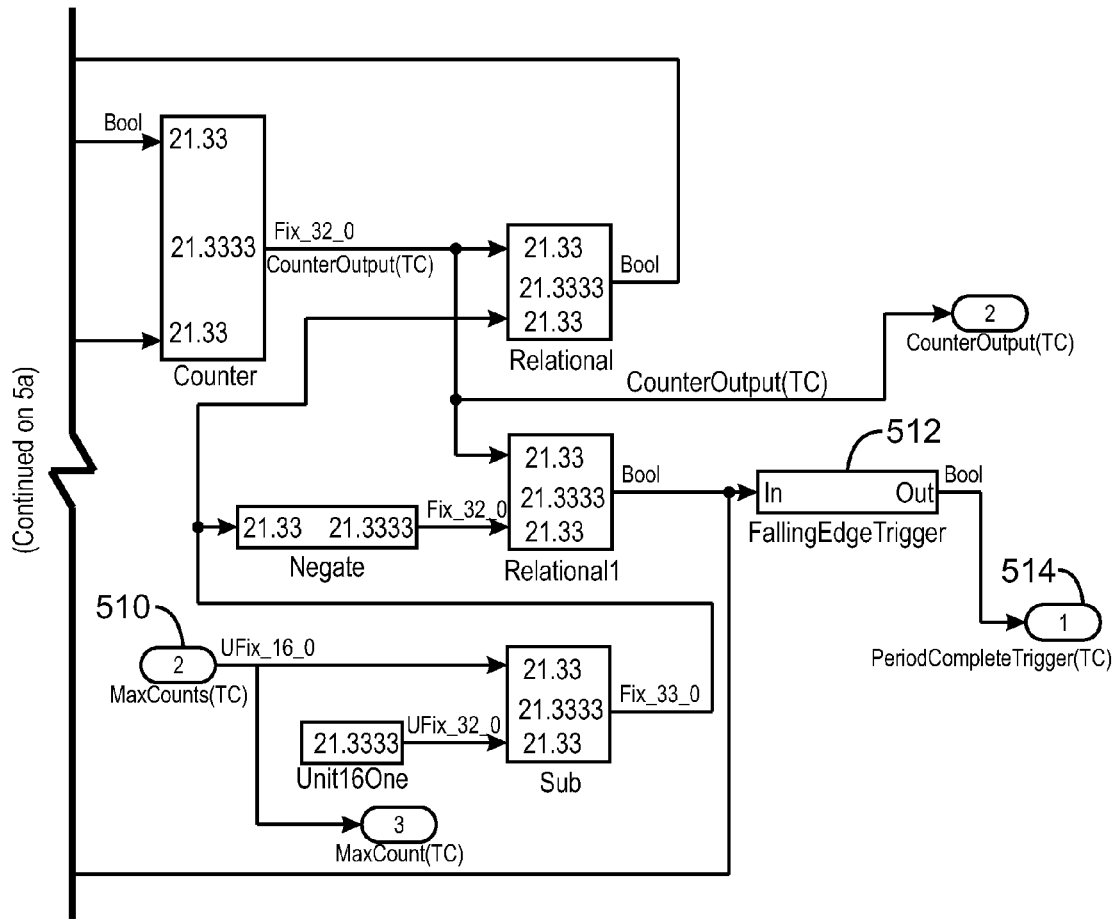
Figure 6:
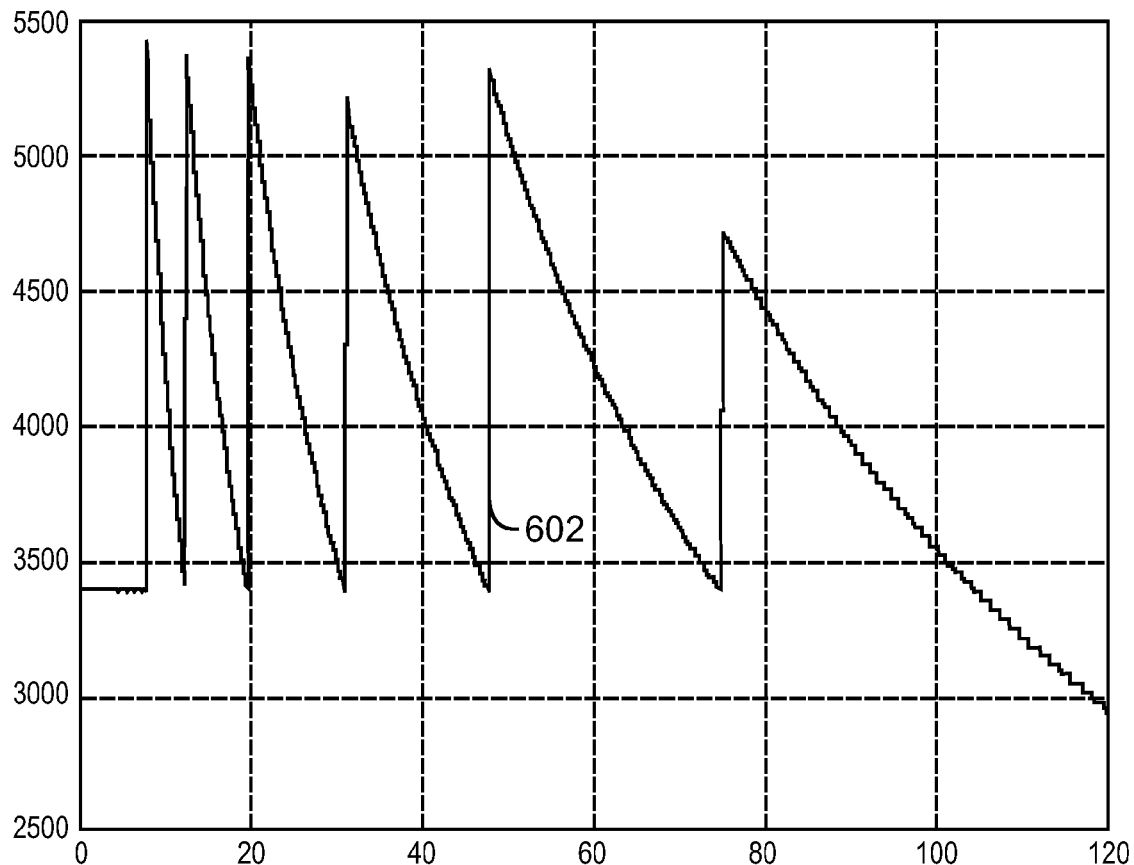
Figure 7:
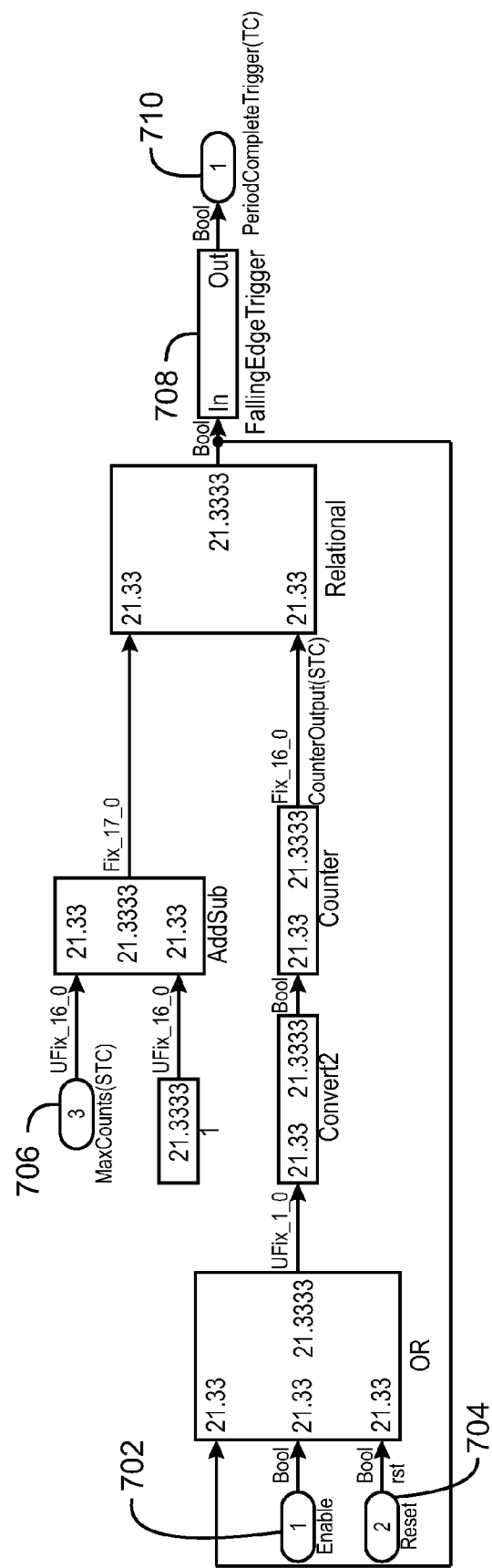
Figure 8:
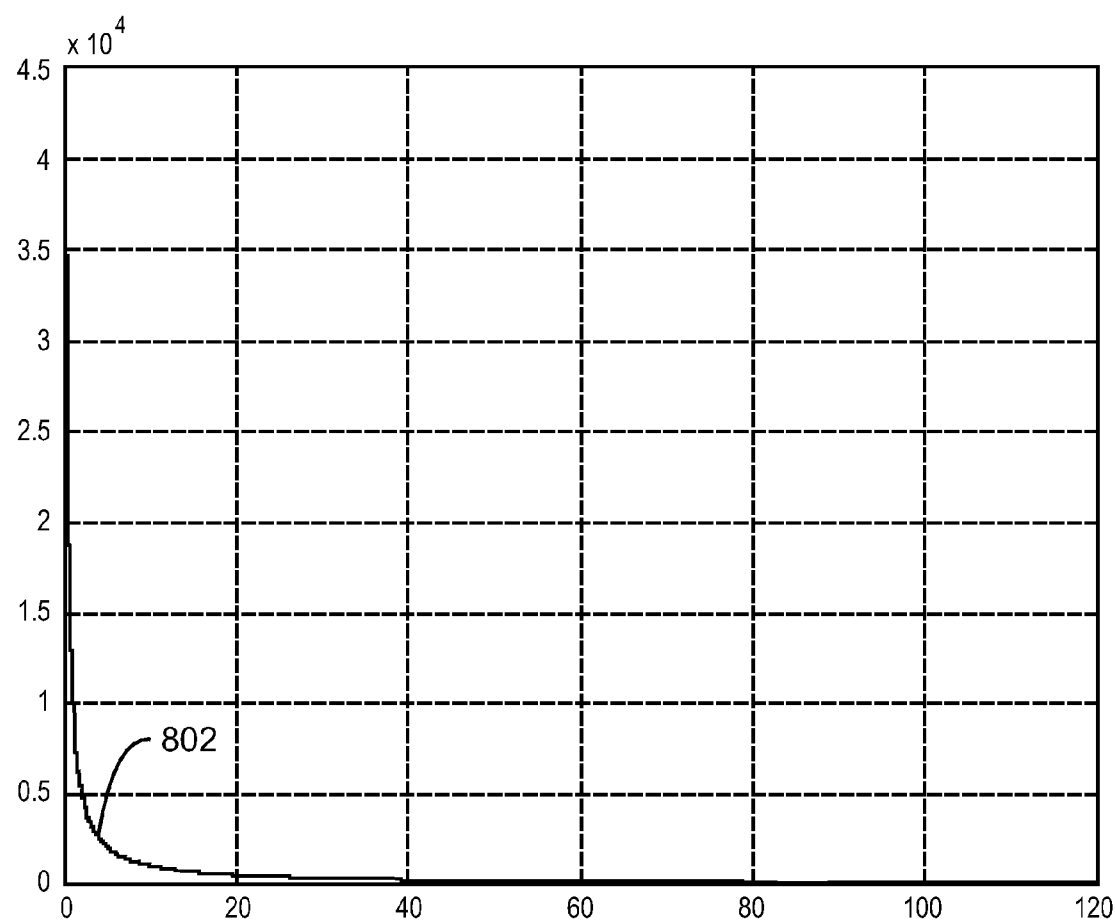
Figure 9A:
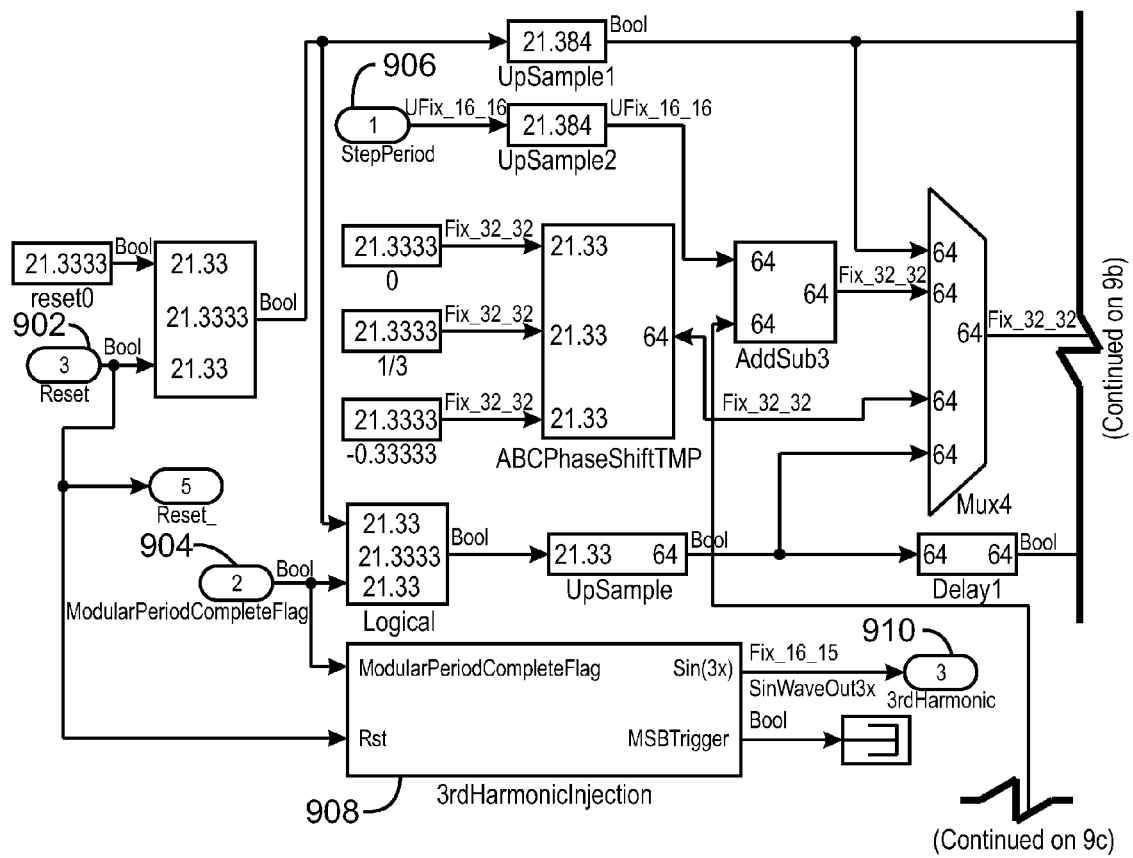
Figure 9B:
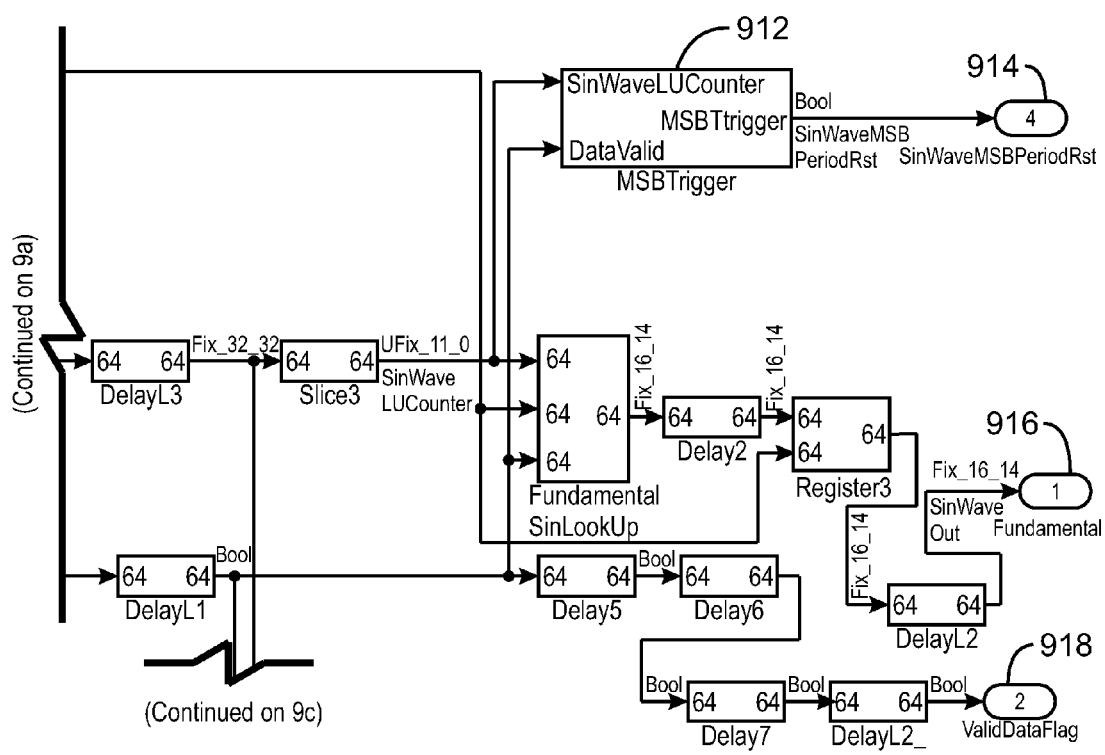
Figure 9C:
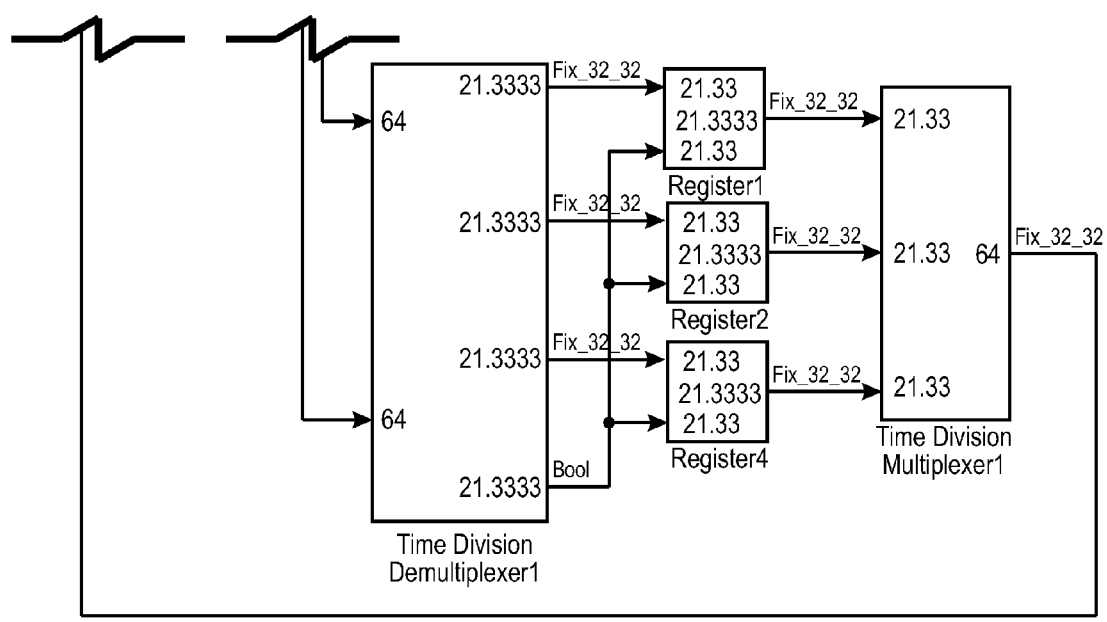
Figure 10A:
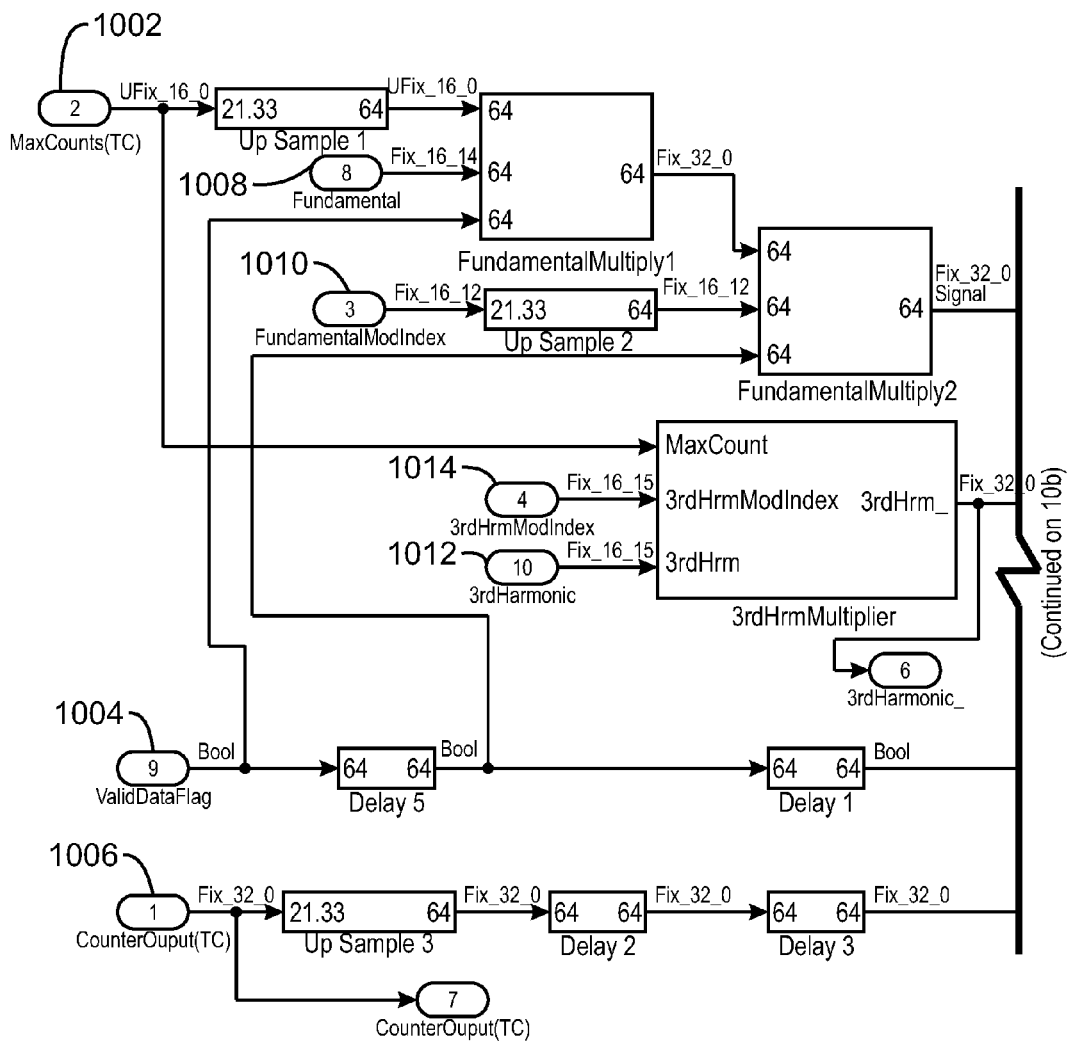
Figure 10B:
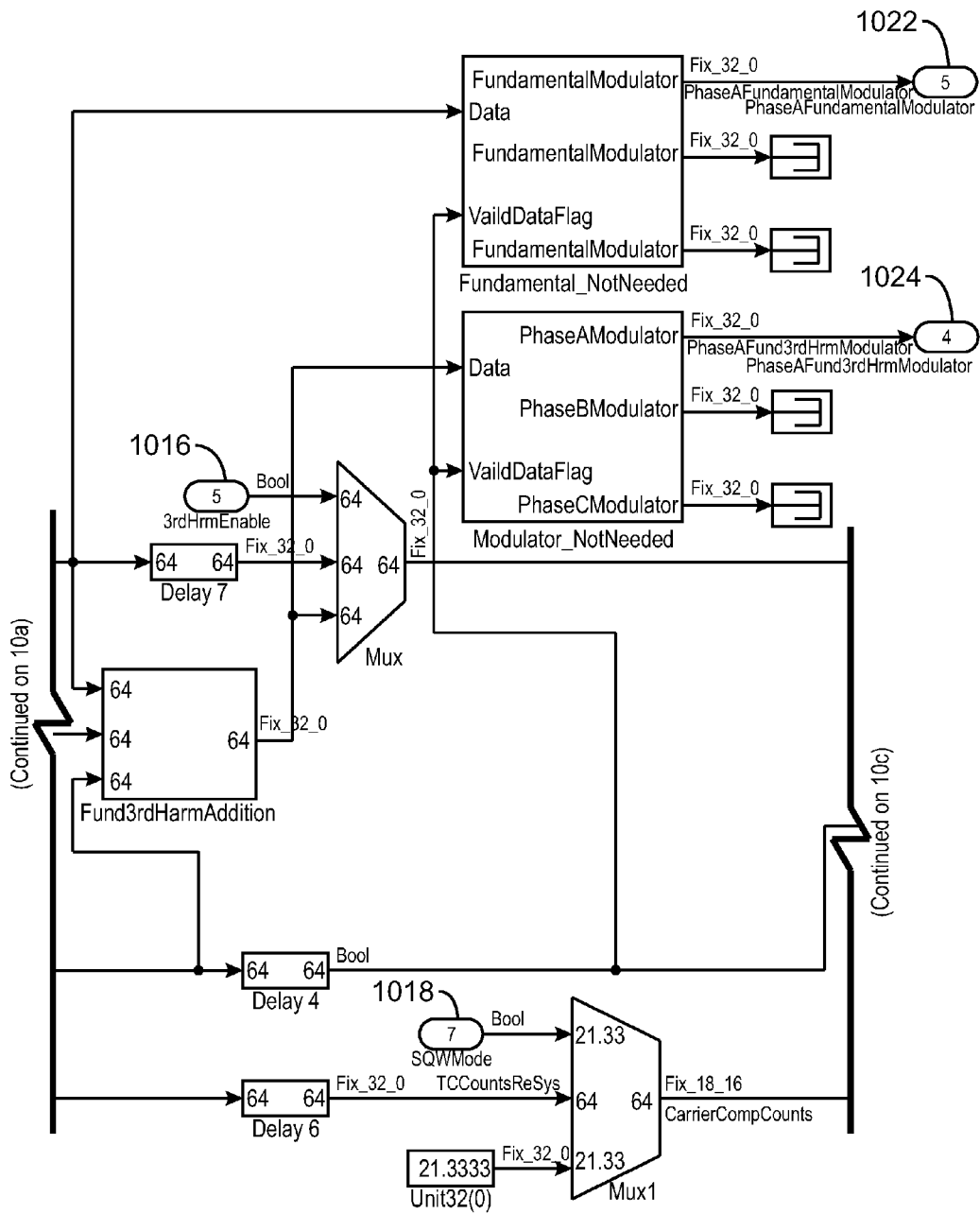
Figure 10C:
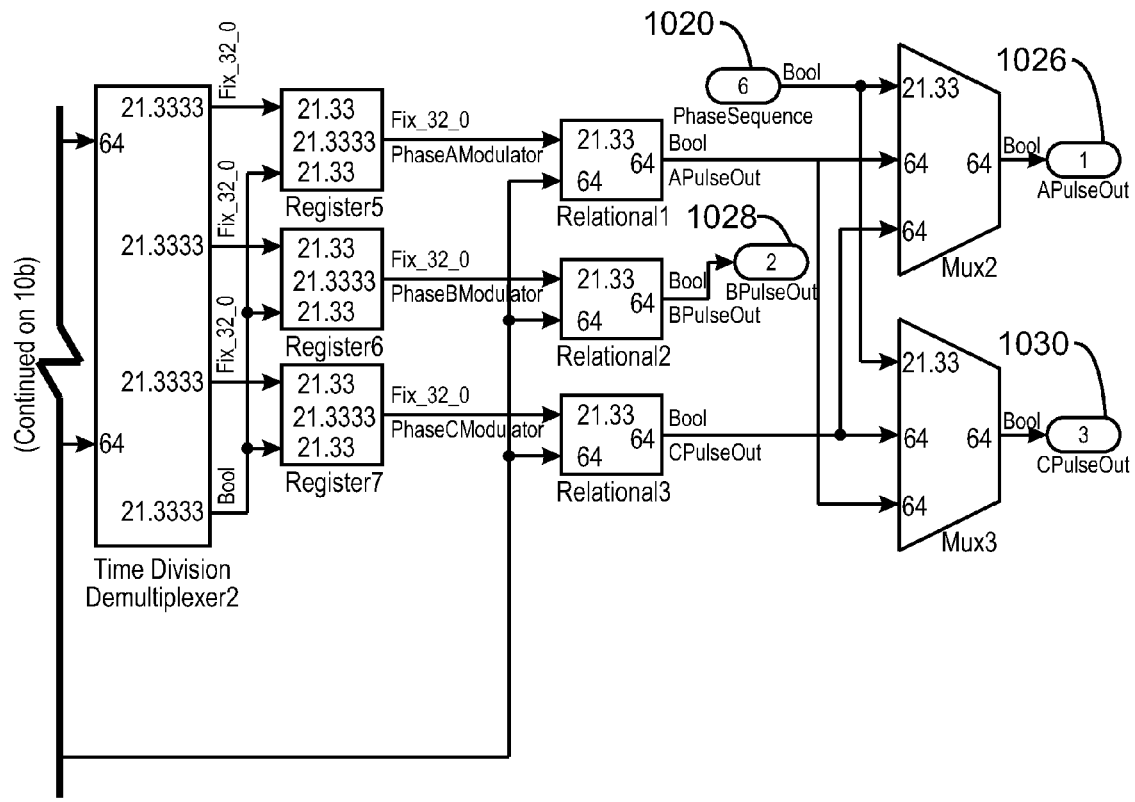
Figure 11:
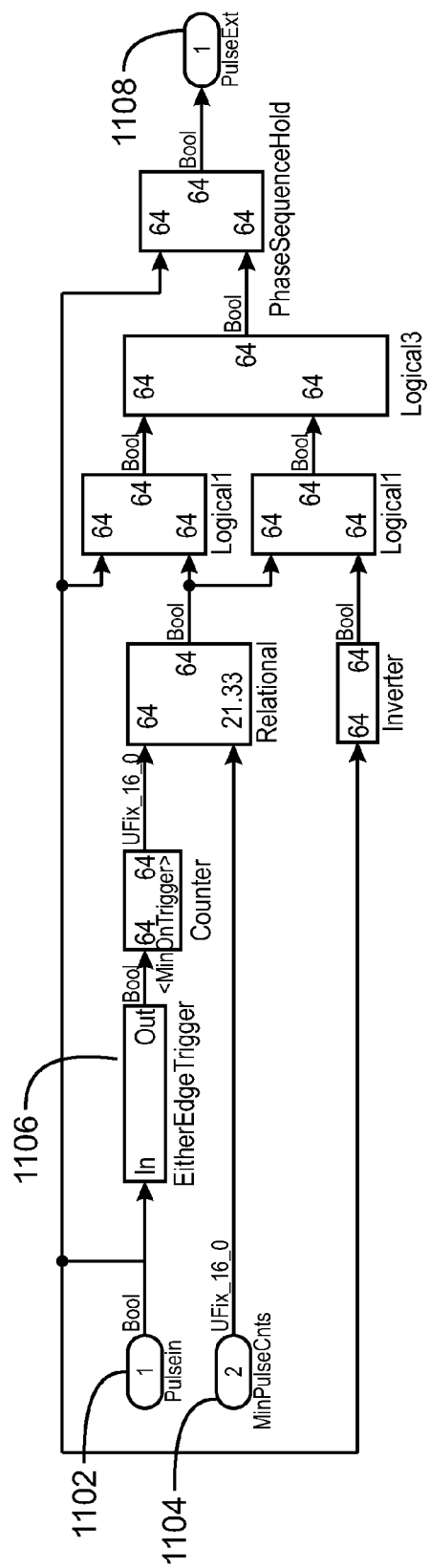
Figure 12:
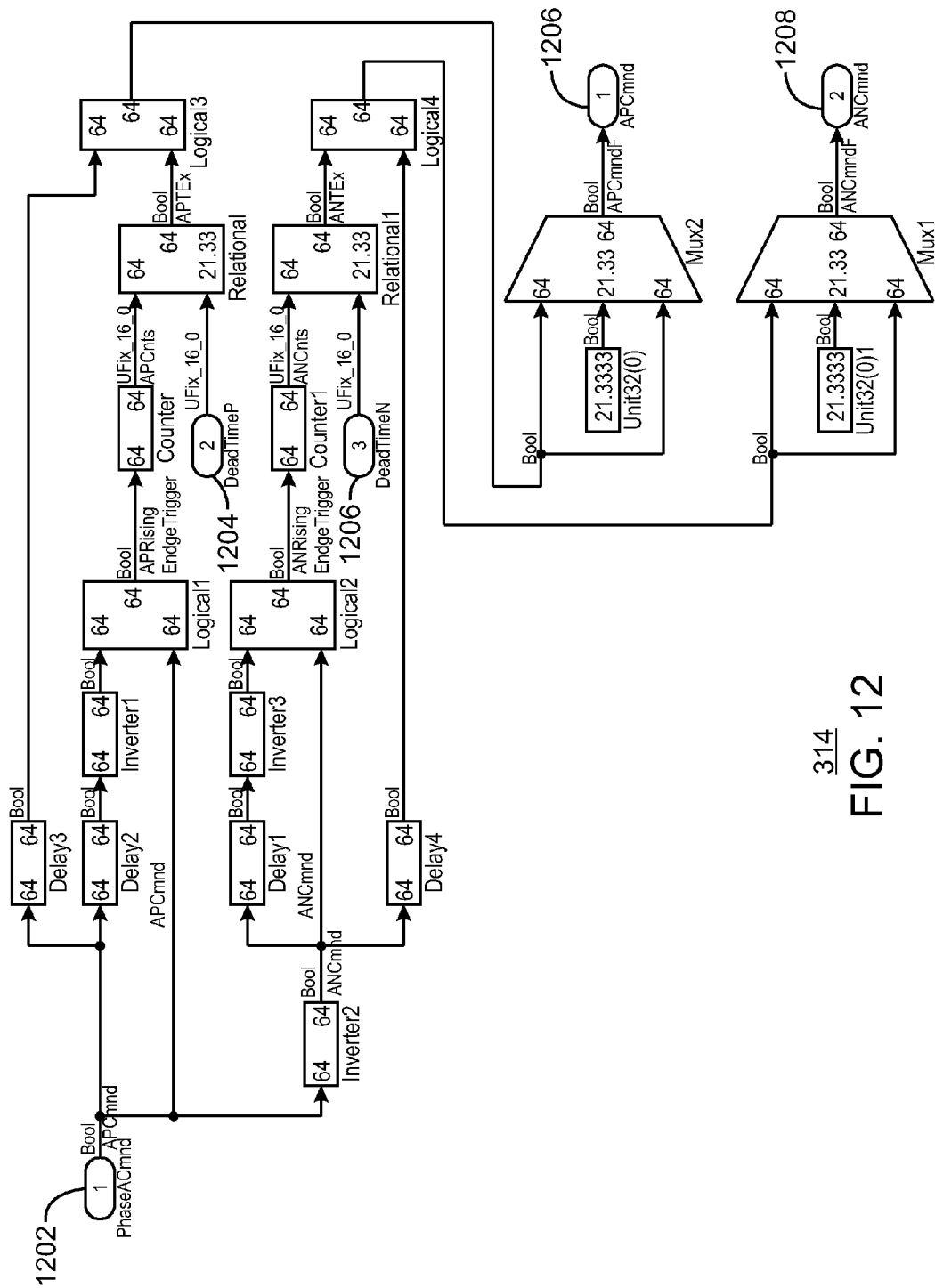
Figure 13:
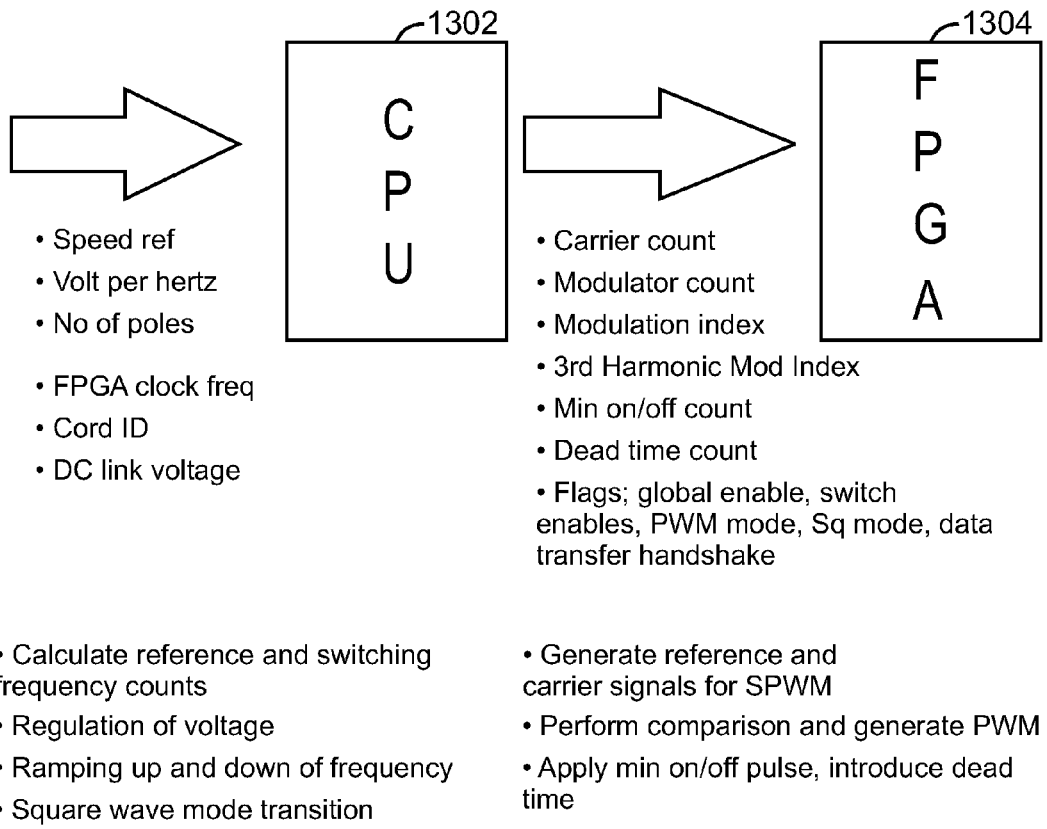
Figure 15:
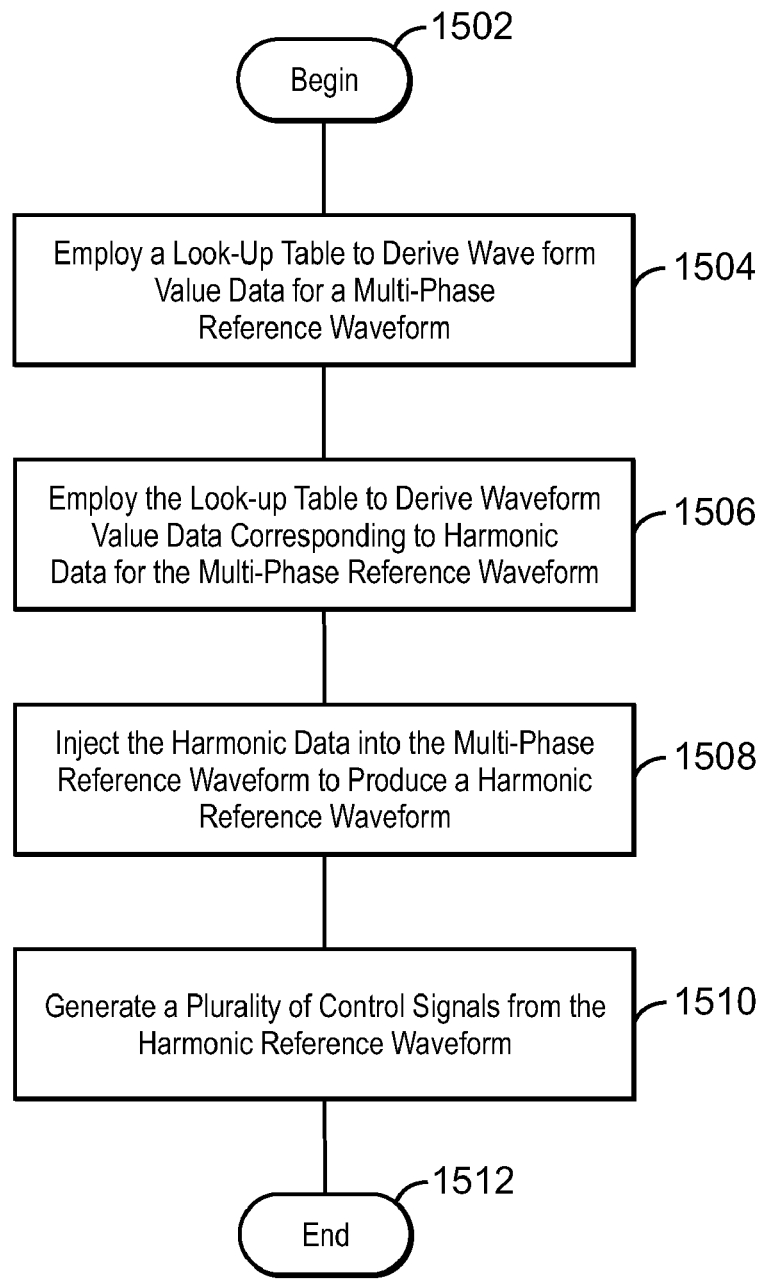

FIG. 3, which includes FIGS. 3a, 3b and 3c, is a block diagram of an inverter firing pattern waveform generator according to an exemplary embodiment of the present invention;

FIG. 4 is a block diagram of a sample and hold block according to an exemplary embodiment of the present invention;

FIG. 5, which includes FIGS. 5a and 5b, is a block diagram of a carrier generation block according to an exemplary embodiment of the present invention;

FIG. 6 is a graph showing reference points for a three-phase modulator according to an exemplary embodiment of the present invention;

FIG. 7 is a block diagram of an output frequency generation block according to an exemplary embodiment of the present invention;

FIG. 8 is a graph showing the output of a three-phase modulator circuit with third harmonic injection capabilities according to an exemplary embodiment of the present invention;

FIG. 9, which includes FIGS. 9a, 9b and 9c, is a block diagram of a three-phase sine wave generation block according to an exemplary embodiment of the present invention;

FIG. 10, which includes FIGS. 10a, 10b and 10c, is a block diagram of a pulse width modulation (PWM) generator block according to an exemplary embodiment of the present invention;

FIG. 11 is a block diagram of a pulse width modulation (PWM) command pulse extender block according to an exemplary embodiment of the present invention;

FIG. 12 is a block diagram of a dead time extender block according to an exemplary embodiment of the present invention;

FIG. 13 is a block diagram showing a control structure that includes an inverter control circuit according to an exemplary embodiment of the present invention;

FIG. 14 is a table showing the use of inverter flags according to an exemplary embodiment of the present invention; and FIG. 15 is a process flow diagram showing a method of producing signals to control an electronic device according to an exemplary embodiment of the present invention.

DETAILED DESCRIPTION

Figure 1:
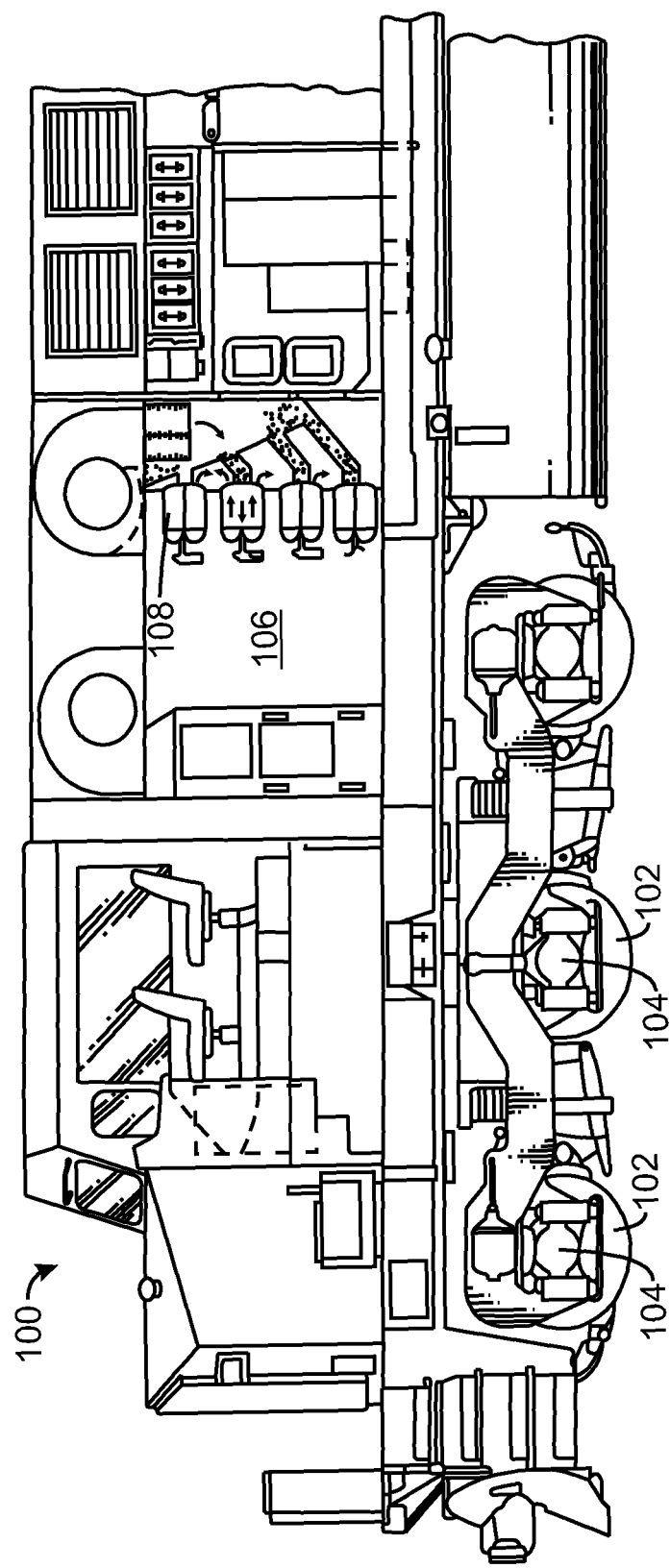
FIG. 1 is a block diagram of a diesel-electric locomotive that may employ an inverter control circuit according to an exemplary embodiment of the present invention.

FIG. 1 is a block diagram of a diesel-electric locomotive that may employ an inverter control circuit according to an exemplary embodiment of the present invention. The locomotive, which is shown in a simplified, partial cross-sectional view, is generally referred to by the reference number 100. A plurality of traction motors, not visible in FIG. 1, are located behind drive wheels 102 and coupled in a driving relationship to axles 104. A plurality of auxiliary motors, not visible in FIG. 1, are located in various locations on the locomotive, and coupled with various blower or radiator fans. The motors may be alternating current (AC) electric motors. As explained in detail below, the locomotive 100 may include a plurality of electrical inverter circuits for controlling electrical power to the motors.

Figure 2:
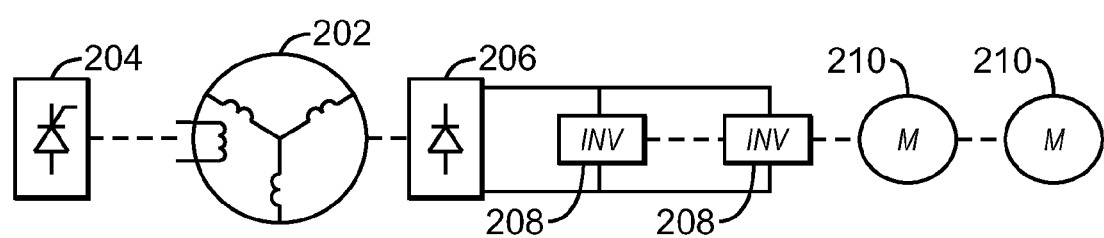
FIG. 2 is a block diagram of a power system according to an exemplary embodiment of the present invention.

FIG. 2 is a block diagram of a power system according to an exemplary embodiment of the present invention. The power system, which is generally referred to by the reference number 200, may be used to control AC power to the locomotive 100 shown in FIG. 1. The power system 200 includes an alternator 202 driven by an on-board internal combustion engine such as a diesel engine (not shown). The power output of the alternator 202 is regulated by field excitation control indicated by a field control 204. Electrical power from alternator 202 is rectified by a rectifier 206, and coupled to one or more inverters 208. The inverters 208 may use high power IGBTs to convert the DC power to AC power, variable frequency, variable voltage amplitude for application to one or more AC motors 210.

Referring again to FIG. 1, electrical power circuits are at least partially located in an equipment compartment 106. The control electronics for the inverters 208 and the field control 204 as well as other electronic components may be disposed on circuit boards held in racks in the equipment compartment 106. Within the equipment compartment 106, the high power IGBT semiconductor devices used in the power conversion may be mounted to air-cooled heat sinks 108.

FIG. 3 is a block diagram of an inverter control circuit 300 according to an exemplary embodiment of the present invention. As explained in detail below, the inverter control circuit 300 generates waveforms that control the firing of the inverters 208 (FIG. 2). Those of ordinary skill in the art will appreciate that the functional blocks and devices shown in FIG. 3 may comprise hardware elements including circuitry, software elements including computer code stored on a tangible, machine-readable medium or a combination of both hardware and software elements. Additionally, the functional blocks and devices of the inverter control circuit 300 are but one example of functional blocks and devices that may be implemented in an exemplary embodiment of the present invention. Those of ordinary skill in the art would readily be able to define specific functional blocks based on design considerations for a particular application.

In an exemplary embodiment of the present invention, the inverter control circuit 300 operates under the control of a main central processing unit (CPU)/supervisory control unit external to the inverter control circuit 300. The use of the inverter control circuit 300 in conjunction with a main CPU/supervisory control unit is explained in greater detail below with reference to FIG. 13. Moreover, the inverter control circuit 300 may be implemented using a field programmable gate array (FPGA) that may be controlled by and synchronized with an external main CPU/supervisory control unit.

The inverter control circuit 300 includes a sample and hold block 302, a carrier generation block 304, a modulator generation block 306, a three-phase sine wave generation block 308, a pulse width modulation (PWM) modulator block 310, an extend pulse generation block 312 and a dead time insertion block 314. The operation of each of these functional blocks is explained in detail below.

In addition, the inverter control circuit 300 may comprise an additional subsystem that is adapted to turn an associated converter off in case of an emergency situation. Examples of emergency situations that may result in the converter being turned off include an overcurrent condition, an overvoltage condition, detection of abnormal operation or the like.

FIG. 4 is a block diagram of the sample and hold block 302 (FIG. 3) according to an exemplary embodiment of the present invention. The sample and hold block 302 receives an input parameter latch trigger signal 402 and a latch data register flag 404. The input parameter latch trigger signal 402 and the latch data register flag 404 are used to provide a signal to a third harmonic modulation block 406, a fundamental modulation block 408, a third harmonic enable block 410, a first maximum count block 412, a second maximum count block 414 and a phase sequence block 416.

In an exemplary embodiment of the present invention, the sample and hold block 302 samples inputs from the main CPU/supervisory control unit external to the inverter control circuit 300. The inputs sampled by the sample and hold block 302 are held up until at least one cycle out the last commanded output frequency has been completed. Moreover, an exemplary embodiment of the sample and hold block 302 may be adapted to perform the same function based on ½, ¼ or every time the CPU/Supervisory control updates the control parameters, cycle intervals and to allow the output frequency to be updated two to four times faster. This may result in non-symmetric waveform output while new values are applied before a complete cycle has finished.

FIG. 5 is a block diagram of the carrier generation block 304 (FIG. 3) according to an exemplary embodiment of the present invention. The carrier generation block 304 receives an enable signal 502, a reset signal 504, a period reset signal 506, an enable synchronization signal 508 and a maximum count signal 510. A falling edge trigger block 512 generates a period complete trigger signal 514 as output.

The carrier generation block 304 provides a counter that may be used for inverter switching commands generation by determining the switching frequency of the converter. The maximum count signal 510, which may be received from the main CPU/supervisory control unit external to the inverter control circuit 300, allows the switching frequency to be a multiple of three of the output frequency.

FIG. 6 is a graph showing reference points for a three-phase modulator such as the carrier generation block 304 according to an exemplary embodiment of the present invention. The graph is generally referred to by the reference number 600. The graph 600 shows a trace 602 in terms of amplitude of the carrier (y-axis) versus converter output frequency (x-axis). The trace 602 represents an example of carrier maximum counts (as provided by the maximum count signal 510 (FIG. 5)) versus output frequency. A signal having the characteristics of the trace 602 may be used as reference points for a three-phase modulator.

FIG. 7 is a block diagram of the LUT pointer for the modulator generation block 306 according to an exemplary embodiment of the present invention. The modulator generation block 306 may be used for drive signal output frequency generation as a look-up table (LUT) pointer to access waveform value data stored in a LUT. The modulator generation block 306 receives an enable signal 702, a reset signal 704 and a maximum counts signal 706. A falling edge trigger block 708 produces a period complete trigger signal 710 as output.

The maximum counts signal 706, which may be received from the main CPU/supervisory control unit external to the inverter control circuit 300 (FIG. 3), may be set based on the output frequency desired from an associated drive circuit. Examples of factors to be considered include a minimum output frequency and a maximum output frequency. The minimum output frequency may be limited by the switching frequency, the resolution desired or the like. The maximum output frequency may be limited by, for example, an FPGA clock frequency of an FPGA on which the inverter control circuit 300 (FIG. 3) is implemented.

FIG. 8 is a graph showing an example relationship between the modulator counts and the output frequency. The graph is generally referred to by the reference number 800. The graph 800 shows a trace 802 in terms of modulator amplitude (y-axis) versus output frequency (x-axis). The trace 802 represents an example of carrier maximum counts (as provided by the maximum count signal 706 (FIG. 7) versus output frequency. A signal having the characteristics of the trace 802 may be used as reference points for a three-phase modulator. The same modulator may be used as a reference point to different LUTs containing third harmonic waveforms to allow capability for harmonic injection and output voltage boost for a given output frequency.

FIG. 9 is a block diagram of a three-phase sine wave generation block 308 (FIG. 3) according to an exemplary embodiment of the present invention. The three-phase sine wave generation block 308 receives a reset signal 902, a modulation period complete flag 904 and a step period signal 906. A third harmonic injection block 908 receives the modulation period complete flag 904 and produces a third harmonic output signal 910. A most significant bit (MSB) trigger block 912 produces a sine wave MSB period reset signal.

The sine wave generation block 308 also produces a fundamental output signal 916 in the form of a three-phase sine wave and a harmonic output in the form of a single phase sine wave with freq of three time the fundamental. In general, the output may take the form of a multi-phase reference waveforms. The fundamental output signal 916 may be used by the PWM modulator block 310 (See FIG. 10) to generate PWM drive signals for the inverters 208 (FIG. 2). The generation of the multi-phase reference signal output may be accomplished by iterating the LUT a number of time corresponding to the number of phases desired (for example, three times for a three-phase output signal). Each cycle may be determined by a synchronization signal for each of the three phases. The use of a single LUT with different reference points allows a reversal of pattern with reference points (i.e., ABC or CBA). Predetermined phase sequences may be implemented.

The three-phase sine wave generation block 308 may also produce a valid data flag 918. The valid data flag 918 may be used to perform signal synchronization with a delay allowing the same multipliers to be used for multiple phases.

As stated above, the three-phase sine wave generation block 308 may be adapted to have third harmonic injection capabilities and may operate based on three FPGA clock cycles. Each clock cycle, a new value for the third harmonic injection is generated. A control signal may enable or disable injection. When enabled, third harmonic data may be injected into the fundamental output signal 916 by adding the third harmonic value. In this case, the fundamental output signal 916 may be referred to as a harmonic reference waveform. According to an exemplary embodiment of the present invention, the third harmonic value may be derived from the same LUT that is also used to generate the sine wave data for the fundamental output signal 916 produced by the sine wave generation block 310.

FIG. 10 is block diagram of the PWM modulator block 310 (FIG. 3) according to an exemplary embodiment of the present invention. The PWM modulator block 310 receives a maximum counts signal 1002, a valid data flag 1004, a counter output signal 1006, a fundamental signal 1008, a fundamental modulation index signal 1010, a third harmonic signal 1012, a third harmonic modulation index signal 1014, a third harmonic enable signal 1016, a square wave (SQW) mode signal 1018 and a phase sequence signal 1020. In an exemplary embodiment of the present invention, the fundamental signal 1008 received by the PWM modulator block 310 is the fundamental output signal 916 from the sine wave generation block 308 (FIG. 9).

The PWM modulator block 310 produces PWM inverter drive signals that may be used to drive the inverters 208 (FIG. 2). Outputs provided by the PWM modulator block 310 are useful for diagnostic and monitoring. Those outputs include an A pulse output 1026, a B pulse output 1028 and a C pulse output 1030. Moreover, the A pulse output 1026, the B pulse output 1028 and the C pulse output 1030 produced by the PWM modulator block 310 may comprise three-phase PWM command signals that may be used as drive signals to drive six IGBT inverters.

FIG. 11 is a block diagram of the extend pulse generation block 312 according to an exemplary embodiment of the present invention. The extend pulse generation block 312 may receive one of the A pulse output 1026 (FIG. 10), the B pulse output 1028 (FIG. 10) and the C pulse output 1030 (FIG. 10). Moreover, those of ordinary skill in the art will appreciate that an implementation of the extend pulse generation block 312 may be used for each of the PWM outputs of the PWM modulator block 310 (FIG. 10).

The extend pulse generation block 312 receives a pulse in signal 1102 and a minimum pulse counts signal 1104. These input signals may be received, for example, from a main CPU/supervisory control unit external to the inverter control circuit 300. The pulse in signal 1102 is delivered to an either edge trigger block 1106. The logic of the extend pulse generation block 312 is used to produce a pulse extend signal. PWM commands received by the extend pulse generation block 312 are extended to a time duration based on system design requirements.

FIG. 12 is a block diagram of the dead time extender block 314 (FIG. 3) according to an exemplary embodiment of the present invention. The dead time extender block 314 receives a phase A command signal 1202, a dead time positive signal 1204 and a dead time negative signal 1206. These inputs may be received from a main CPU/supervisory control unit external to the inverter control circuit 300 (FIG. 3). The logic of the dead time extender block 314 produces an AP command 1206 and an AN command 1208.

PWM commands received by the dead time extender block 314 have dead time added between positive and negative commands for each phase of operation. The amount of dead time added may vary based on individual system design requirements.

FIG. 13 is a block diagram showing a control structure that includes an inverter control circuit according to an exemplary embodiment of the present invention. The control structure is generally referred to by the reference number 1300. The control structure 1300 includes a main CPU/supervisory control unit 1302. The main CPU/supervisory control unit 1302 may perform a number of control functions relative to the inverter control circuit 300 (FIG. 3). For example, the main CPU/supervisory control unit 1302 may calculate reference and switching frequency counts. In addition, the main CPU/supervisory control unit 1302 may provide voltage regulation and may ramp drive signal frequency up or down. The main CPU/supervisory control unit 1302 may also perform square wave mode transition.

In the exemplary embodiment shown in FIG. 13, the inverter control circuit 300 (FIG. 3) is implemented on an FPGA 1304 that is connected to the main CPU/supervisory control unit 1302. The inverter control circuit 300 (FIG. 3) may be adapted to generate reference and carrier signals for sinusoidal pulse width modulation (SPWM). The inverter control circuit 300 (FIG. 3) may perform comparisons and generate PWM inverter drive signals. In addition, the inverter control circuit 300 (FIG. 3) may apply a minimum on/off pulse and/or introduce dead time into a PWM command sequence.

The main CPU/supervisory control unit 1302 receives several inputs. As shown in FIG. 13, examples of input data that may be received by the main CPU/supervisory control unit 1302 include a speed reference signal, a Volt per Hertz signal, a number of poles, an FPGA clock frequency, a card identifier and a DC link voltage.

The main CPU/supervisory control unit 1302 may be adapted to provide a number of inputs to the inverter control circuit 300 (FIG. 3) on the FPGA 1304. Examples of data that may be provided to the inverter control circuit 300 (FIG. 3) include carrier count data, modulator count data, modulation index data, third harmonic modulation index data, minimum on/off count data and dead time count data. In addition, the main CPU/supervisory control unit 1302 may provide a number of indicator flags to the inverter control circuit 300 (FIG. 3). Examples of indicator flags that may be provided to the inverter control circuit 300 (FIG. 3) include a global enable flag, switch enable flags, a PWM mode flag, a square wave mode flag and a data transfer handshake flag.

In one exemplary embodiment of the present invention, a carrier signal is generated using an up-down counter. The maximum value of the counter may be a function of a clock frequency of the FPGA 1304, time multiplexing and the carrier frequency required. The modulator signal may be stored as a LUT having a fixed number of locations, such as 2,048 separate locations. The modulator signal data stored in the LUT may correspond to a sine wave of amplitude one. Moreover, the modulator signal data may be stored as 16-bit signed fixed point numbers with a scale of 4,096 (12 bits). Those of ordinary skill in the art will appreciate that increasing the number of locations in the LUT decreases the potential error of a waveform constructed from the data stored in the LUT.

The modulator count may be used to determine the amount of time after which the next number in the sine wave lookup table will be used as output. This may be done as a function of the clock frequency of the FPGA 1304, time multiplexing, the LUT length and the frequency of the output waveform. In an exemplary embodiment of the present invention, waveform value data corresponding to the third harmonic data is derived from the same common LUT that is used to obtain the modulator signal data. Moreover, the third harmonic data may be determined by using a LUT index that changes three times as fast as the fundamental reference used to obtain the waveform value data for the modulator signal.

Once obtained from the LUT, the sine wave data may be multiplied by the modulation index and then scaled to the half of the carrier count. It may then be compared with the carrier signal to produce the PWM output. A minimum on/off pulse may be applied to make sure that any on/off pulse smaller than a particular value is converted to a pulse having a duration of the particular value. For example, if the minimum pulse duration is 34 μs, pulses shorter than 34 μs are converted to 34 μs pulses. In an exemplary embodiment of the present invention, the pulses for top and bottom switches may be obtained after applying a dead time equal to the particular value.

A data valid flag may be used to synchronize the operation of the inverter circuit 300 (FIG. 3) on the FPGA 1304 with the main CPU/supervisory control unit 1302. Every input to the inverter control circuit 300 (FIG. 3) on the FPGA 1304 may be double buffered, with the exception of the flag, which is direct. At the end of every fundamental cycle, the FPGA 1304 reads the input buffers and sets the data valid flag to zero. The FPGA 1304 takes in the new values only if the fundamental cycle is complete and the data valid flag has been set to one again.

FIG. 14 is a table showing the use of inverter flags according to an exemplary embodiment of the present invention. The table is generally referred to by the reference number 1400.

In an exemplary embodiment of the present invention, a speed reference may be expressed as a 32-bit unsigned integer with 12-bit scaling. It may be ramped up at a configurable rate. By way of example, the speed reference may be ramped up at the rate of 10 rpm per step. The speed reference may be converted to a frequency command using the number of poles. This is saturated between 0.2 to 120 Hz.

The voltage command may be calculated using the Volts per Hertz of the motor load. The voltage command may be directly converted to a modulation index command using the DC link voltage if, for example, the actual voltage feedback is not available. Moreover, a closed loop regulator may be used for the conversion when the feedback is available. A square wave mode flag may be set if the modulation index is greater than a particular value, such as 7.5.

If the frequency is below a particular value, such as 7.6 Hz, an asynchronous PWM flag may be set and the switching frequency may be set accordingly. Otherwise, the ratio of switching frequency to fundamental frequency may be varied according to a particular pattern, such as 129, 81, 51, 33, 21 and 15. These values are selected to keep the switching frequency in a range between 1,000 Hz and 1,575 Hz with a minimum of gear switches.

A reference frequency command may be used to calculate the modulator count. A switching frequency command may be used to calculate the carrier count.

FIG. 15 is a process flow diagram showing a method of producing signals to control an electronic device according to an exemplary embodiment of the present invention. At block 1502, the process begins.

A LUT is employed at block 1504 to derive waveform value data for a multi-phase reference waveform. The same LUT is then employed to derive waveform value data corresponding to harmonic data for the multi-phase reference waveform, as shown at block 1506.

At block 1508, the harmonic data is injected into the multi-phase reference waveform to produce a harmonic reference waveform. A plurality of control signals is generated from the harmonic reference waveform, as shown at block 1510. The process ends at block 1512.

An exemplary embodiment of the present invention may provide several advantages. For example, the usage of synchronization signals and a single and a common LUT for modulator generation provides efficient resource utilization for FPGA implementations of the inverter control circuit 300 (FIG. 3). In addition, exemplary embodiments of the present invention may be implemented in a wide variety of systems having differing requirements for output and switching frequencies based on hardware limitations. The simple design provides the ability to increase drive signal voltage and allows the selective injection of third harmonic data using the common LUT. An exemplary embodiment of the present invention also provides flexibility to employ multiple FPGA clock cycles for control waveform generation.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of producing a plurality of control signals to control an electronic device, the method comprising:
   iterating a look-up table sequentially in time in accordance with a first iteration sequence to derive waveform value data for a multi-phase reference waveform, wherein the first iteration sequence is determined by a number of output phases of the plurality of control signals;
   iterating the look-up table sequentially in time in accordance with a second iteration sequence to derive waveform value data corresponding to harmonic data for the multi-phase reference waveform, wherein the second iteration sequence is determined by a number of inverters to be controlled by the plurality of control signals;
   injecting the harmonic data into the multi-phase reference waveform to produce a harmonic reference waveform; and
   generating the plurality of control signals from the harmonic reference waveform.

2. The method recited in claim 1, comprising driving a plurality of inverters with the plurality of control signals.

3. The method recited in claim 1, comprising accessing the look-up table at different points using an index that corresponds to a phase difference of the multi-phase reference waveform to obtain the waveform value data to create the plurality of control signals.

4. The method recited in claim 1, wherein the harmonic data comprises third harmonic data of a fundamental frequency of the multi-phase reference waveform.

5. The method recited in claim 1, comprising synchronizing the plurality of control signals based on a synchronization signal received from an external processor.

6. The method recited in claim 1, wherein the plurality of control signals comprise pulse-width modulated commands to an inverter.

7. The method recited in claim 6, comprising extending a duration of the pulse-width modulated commands.

8. The method recited in claim 6, wherein a duration of the pulse-width modulated commands is extended by a dead time.

9. An inverter control system, comprising:
   a storage medium that stores a look-up table containing waveform value data; and
   a control circuit configured to:
   iterate the look-up table sequentially in time in accordance with a first iteration sequence to derive waveform value data for a multi-phase reference waveform, wherein the first iteration sequence is determined by a number of output phases of the inverter control system;
   iterate the look-up table sequentially in time in accordance with a second iteration sequence to derive waveform value data corresponding to harmonic data for the multi-phase reference waveform, wherein the second iteration sequence is determined by a number of inverters to be controlled by the inverter control system;
   inject the harmonic data into the multi-phase reference waveform to produce a harmonic reference waveform; and
   generate a plurality of control signals from the harmonic reference waveform.

10. The inverter control system recited in claim 9, comprising driving a plurality of inverters with the plurality of control signals.

11. The inverter control system recited in claim 9, comprising accessing the look-up table at different points using an index that corresponds to a phase difference of the multi-phase reference waveform to obtain the waveform value data to create the plurality of control signals.

12. The inverter control system recited in claim 9, wherein the harmonic data comprises third harmonic data of a fundamental frequency of the multi-phase reference waveform.

13. The inverter control system recited in claim 9, comprising synchronizing the plurality of control signals based on a synchronization signal received from an external processor.

14. The inverter control system recited in claim 9, wherein the plurality of control signals comprise pulse-width modulated commands to an inverter.

15. The inverter control system recited in claim 14, comprising extending a duration of the pulse-width modulated commands.

16. The inverter control system recited in claim 14, wherein a duration of the pulse-width modulated commands is extended by a dead time.

* * * * *